Patented Apr. 8, 1952

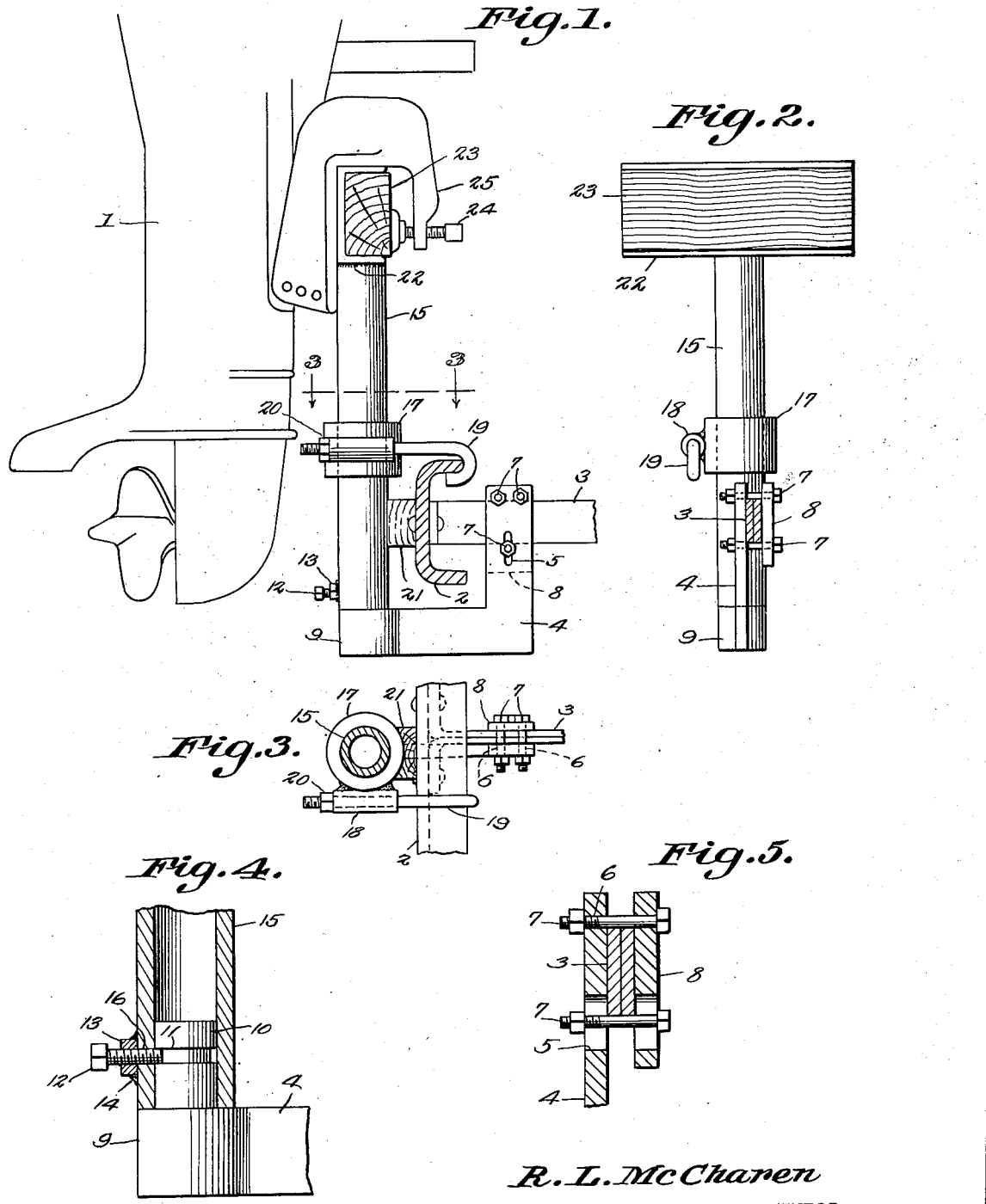

2,592,050

UNITED STATES PATENT OFFICE 2,592,050

OUTBOARD MOTOR CARRIER FOR AUTOMOBILE BUMPERS

Roy L. McCharen, Borger, Tex.

Application April 27, 1950, Serial No. 158,521

2 Claims. (Cl. 224—42.03)

This invention relates to a means attachable to an automobile bumper and adapted to support an outboard motor, for transportion of said motor to and from a place at which it is to be used.

An important object of the present invention is to provide a carrier of the type stated that is readily attachable to a conventional automobile bumper, with speed and ease.

Another important object is to provide a carrier of the type stated that can be manufactured at relatively low cost.

Still another object is to provide an outboard motor carrier which will not mar the bumper or other portions of the automobile in any way.

A still further object of the invention is to provide an outboard motor carrier to which the outboard motor can be clamped in the same manner as when it is clamped to the stern of a boat.

Still another object is to provide an outboard motor carrier that is adjustable to fit any type of bumper.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings

Figure 1 is a side elevational view of an outboard motor carrier formed in accordance with the present invention as it appears when in use.

Fig. 2 is an end elevation taken from the right of Fig. 1.

Fig. 3 is a section taken on line 3—3 of Fig. 1.

Fig. 4 is an enlarged fragmentary vertical sectional view through the lower portion of the carrier.

Fig. 5 is an enlarged transverse sectional view through the clamp engaging the bumper support.

Referring to the drawings in detail, an outboard motor has been fragmentarily illustrated at 1, an automobile bumper at 2 and a bumper support arm at 3. These elements comprise no part of the present invention, as will be readily appreciated.

In accordance with the present invention, I provide a base 4 formed from an L-shaped piece of bar material, one end of said base being extended upwardly and being formed with the vertically disposed slot 5, said slot being located below the openings 6 formed at the uppermost end of said upwardly extended portion of the base, said slot and openings receiving a plurality of clamping bolts 7 respectively extending over and under the bumper support arm 3, said bolts 7 extending through the clamp plate 8 having the openings and slot in registry with the openings 6 and slot 5 of the main portion of the base.

By reason of this arrangement, it may be noted that the base is secured at one end removably to a conventional bumper support arm 3, and before being clamped to said bumper support arm, can be adjusted longitudinally of said bumper support arm toward or away from a bumper 2 as necessary. Additionally, the connection of the base to the bumper support arm is such as to permit the base to receive bumper support arms varying in thickness and in width.

In any event, the base, when clamped to the bumper support arm 3, has a lower portion extending under the bumper 2 as readily seen from Fig. 1, and this lower portion is formed at its outer end with a sleeve 9 in which is fixedly mounted the upstanding spindle 10 having the annular groove 11 receiving the set screw 12 threadable through the nut 13 welded at 14 to the lower end of the tubular post 15, this being fitted rotatably over the spindle 10 and being formed with the smooth walled opening 16 in registry with the threaded opening of the nut 13.

The tubular post 15 extends vertically past the bumper 2, exteriorly of said bumper, and intermediate its ends is provided with the collar 17 that is rotatable upon the post 15 and is shiftable longitudinally of said post. The collar 17 has welded thereto the horizontally extending sleeve 18 through which extends the hook 19 that is adapted to be rotated within the sleeve 18 and which in addition is shiftable longitudinally of the bore of said sleeve. The rear end of the hook 19 is threaded and receives the clamping nut 20 that threads against one end of the sleeve 18. The other end of the hook is adapted to grip one edge of the bumper 2, as readily seen from Fig. 1.

A wooden spacer block 21 is interposed between the tubular post 15 and the bumper 2, to prevent marring of the bumper by the post.

At its upper end, the post 15 has fixedly secured thereto in any suitable manner the channeled header 22 in which is positioned the clamping block 23. The clamping screw 24 of the U-shaped clamp 25 of the conventional outboard motor 1 is adapted to be threaded against said block 23, the block 23 representing a surface not unlike the stern of a boat, so as to permit the outboard motor to be readily clamped to the upper end of the post.

From the drawings and from the description which has been provided herein, I believe it will be apparent that the carrier formed in accordance with the invention can be clamped to the bumper of any make of automobile, the base being adapted to be clamped adjustably to the bumper support arm regardless of the thickness, width, or direction of said arm.

After the base has been positioned upon the bumper support arm, the tubular post 15 can be rotated as necessary to accommodate the general curving of the bumper, thus to position the outboard motor in such a manner as to prevent said motor from coming in contact with any portion of the vehicle to which the carrier is attached. Additionally, the collar 17 can be adjusted upwardly and downwardly upon the post 15, so as to position the hook 19 at a location where it can grip the upper edge of the particular bumper 2. The hook 19 is then capable of being drawn into tight, gripping relationship with the upper edge, and the carrier is thus positioned, ready for use.

In addition to the adjustable features of the carrier, that permit its use upon any make of automobile, it is believed to be of importance to note that the weight of the outboard motor is transmitted not to the bumper 2, but to the bumper support arm 3, this being so by reason of the transmission of the weight through the length of the tubular post, and thence to the L-shaped base that underlies the bumper and is connected solely to the bumper support arm.

What is claimed is:

1. A carrier for outboard motors comprising an L-shaped base; a clamp at one end of said base adjustable as to width and thickness and adapted to straddle a bumper support arm, said base extending downwardly from said bumper support arm and underlying and being spaced from a bumper supported by said arm, the other end of said base projecting beyond said bumper and being provided with an upstanding spindle; a tubular post rotatably mounted upon said spindle; a hook mounted for vertical and rotatable adjustment upon said post and adapted to grip one edge of a bumper supported by said bumper support arm; and a channeled header at the upper end of said post and proportioned to receive the clamp of an outboard motor.

2. A carrier for outboard motors comprising a base of approximate L-shape, one end of said base adapted to be clamped adjustably to a bumper support arm, the other end of said base being free of and underlying a bumper supported by said arm; a spindle on said other end of said base; a tubular post rotatably mounted upon said spindle, and extending upwardly past and exteriorly of said bumper; means of preventing accidental separation of said tubular post from the spindle; a collar mounted on said post intermediate the upper and lower ends thereof; a sleeve rigidly secured to said collar, a hook shiftable longitudinally of and rotatable in said sleeve and adapted to grip the upper edge of said bumper; a spacer block interposed between the tubular post and said bumper; and means at the upper end of the post adapted to receive the clamp of an outboard motor.

ROY L. McCHAREN.

REFERENCES CITED

The following references are of record in the file of this patent:

UNITED STATES PATENTS

| Number | Name | Date |
| --- | --- | --- |
| 2,439,707 | Wright | Apr. 13, 1948 |
| 2,512,267 | Donnelley | June 20, 1950 |

FOREIGN PATENTS

| Number | Country | Date |
| --- | --- | --- |
| 715,006 | Germany | Dec. 12, 1941 |